United States Patent
Schaffer

(10) Patent No.: US 7,130,866 B2
(45) Date of Patent: Oct. 31, 2006

(54) CONTROLLING THE GROWTH OF A FEATURE FREQUENCY PROFILE BY DELETING SELECTED FREQUENCY COUNTS OF FEATURES OF EVENTS

(75) Inventor: J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 550 days.

(21) Appl. No.: 10/208,604

(22) Filed: Jul. 30, 2002

(65) Prior Publication Data
US 2004/0024777 A1   Feb. 5, 2004

(51) Int. Cl.
*G06F 17/30* (2006.01)
(52) U.S. Cl. .................... 707/104.1; 707/206; 725/39
(58) Field of Classification Search ........ 707/205–206, 707/104.1; 725/46, 39; 711/170
See application file for complete search history.

(56) References Cited

U.S. PATENT DOCUMENTS

| | | | |
|---|---|---|---|
| 5,488,725 A | | 1/1996 | Turtle et al. |
| 5,661,820 A | | 8/1997 | Kegelmeyer, Jr. |
| 6,658,438 B1 * | | 12/2003 | Moore et al. ............. 707/205 |
| 6,766,525 B1 * | | 7/2004 | Lee et al. ................. 725/46 |
| 2002/0059603 A1 * | | 5/2002 | Kelts ....................... 725/47 |
| 2002/0087389 A1 * | | 7/2002 | Sklarz et al. ............ 705/10 |
| 2002/0129368 A1 * | | 9/2002 | Schlack et al. ........ 725/46 |
| 2003/0093792 A1 * | | 5/2003 | Labeeb et al. .......... 725/46 |
| 2003/0101449 A1 * | | 5/2003 | Bentolila et al. ....... 725/10 |
| 2003/0145326 A1 * | | 7/2003 | Gutta et al. ............. 725/46 |
| 2004/0193572 A1 * | | 9/2004 | Leary ...................... 707/1 |
| 2004/0261107 A1 * | | 12/2004 | Lee et al. ................ 725/46 |
| 2005/0185933 A1 * | | 8/2005 | Marsh ..................... 386/95 |

FOREIGN PATENT DOCUMENTS

| | | |
|---|---|---|
| WO | 0158145 | 8/2001 |
| WO | 0159610 | 8/2001 |
| WO | 0169432 | 9/2001 |
| WO | 0184353 | 11/2001 |

* cited by examiner

Primary Examiner—Debbie M. Le
(74) Attorney, Agent, or Firm—Michael E. Belk; Paul Im

(57) ABSTRACT

A method and system for controlling the growth of a features frequency profile of a time-ordered sequence of events, wherein each event has features specific to each event. The events are sequentially processed in an order of processing. The processing includes selecting for each event processed at least one feature comprised by the event. The processing updates a frequency count of each feature selected. The frequency counts are periodically reduced in magnitude by a reduction factor. Frequency counts are selected for deletion upon satisfaction of a condition that favors deletion of those frequency counts having a magnitude less than a threshold value. The selected frequency counts are then deleted. The present invention employs an economical use of memory to store data associated with the features frequency profile and uses a features preference profile that is more responsive to recent information than to older information.

54 Claims, 5 Drawing Sheets

| PROGRAM # | N | FEATURES PRESENT ||||  FEATURES FREQUENCY COUNT ||||
|---|---|---|---|---|---|---|---|---|---|
| | | SPORTS | NEWS | LIVE | TAPED | SPORTS | NEWS | LIVE | TAPED |
| 1 | 1 | 1 | | 1 | | 1 | | 1 | |
| 2 | 2 | 1 | | 1 | | 2 | | 2 | |
| 3 | 3 | 1 | | 1 | | 3 | | 3 | |
| 4 | 4 | 1 | | 1 | | 4 | | 4 | |
| 5 | 5 | | 1 | 1 | | 4 | 1 | 5 | |
| 6 | 6 | | | 1 | | 4 | 1 | 6 | |
| 7 | 7 | | | 1 | | 4 | 1 | 7 | |
| 8 | 8 | | 1 | 1 | | 4 | 2 | 8 | |
| 9 | 9 | 1 | | | 1 | 5 | 2 | 8 | 1 |
| 10 | 10 | 1 | | 1 | | 3.6 | 1.2 | 5.4 | 0.6 |
| 11 | 6 | 1 | | 1 | | 4.6 | 1.2 | 6.4 | --- |
| 12 | 7 | | | 1 | | 4.6 | 1.2 | 7.4 | |
| 13 | 8 | | 1 | 1 | | 4.6 | 2.2 | 8.4 | |
| 14 | 9 | 1 | | 1 | | 5.6 | 2.2 | 9.4 | |
| 15 | 10 | | | 1 | | 3.36 | 2.2 | 6.24 | |
| 16 | 6 | | | 1 | | 3.36 | 1.32 | 7.24 | |
| 17 | 7 | 1 | | 1 | | 4.36 | 1.32 | 8.24 | |
| 18 | 8 | 1 | | 1 | | 5.36 | 1.32 | 9.24 | |
| 19 | 9 | 1 | | 1 | | 6.36 | 1.32 | 10.24 | |
| 20 | 10 | 1 | | 1 | | 4.42 | 0.79 | 6.74 | |
| 21 | 6 | 1 | | 1 | | 5.42 | ... | 7.74 | |
| 22 | 7 | 1 | | 1 | | 6.42 | | 8.74 | |

FIG. 4

CONTROLLING THE GROWTH OF A FEATURE FREQUENCY PROFILE BY DELETING SELECTED FREQUENCY COUNTS OF FEATURES OF EVENTS

BACKGROUND OF THE INVENTION

1. Technical Field

The present invention relates generally to a method and system for controlling the growth of a features frequency profile, and more specifically to method and system for controlling the growth of a features frequency profile of a time-ordered sequence of events such that each event has features specific to each event.

2. Related Art

A television (TV) user's TV viewing history may be used to develop a TV program preference profile for the TV user, which may be employed with the assistance of a computing device to predict which TV programs the TV viewer would like to watch. However, as more TV programs are viewed by the TV viewer, the preference profile can increase in size without bound. This may become a problem if the data storage requirements of the preference profile exceeds the amount of memory space available in the computing device. Accordingly, there is a need for a method and system that avoids having the data storage requirements of the preference profile exceed the amount of memory space available in the computing device.

SUMMARY OF THE INVENTION

The present invention provides a method for controlling the growth of a features frequency profile of a time-ordered sequence of events, wherein each event has features specific to each event, said method comprising:

sequentially processing the events in an order of processing, including selecting for each event processed at least one feature comprised by the event and updating a frequency count of each feature so selected;

selecting frequency counts for subsequent deletion upon satisfaction of a condition that determines which frequency counts to delete; and deleting said selected frequency counts.

The present invention provides a system for controlling the growth of a features frequency profile of a time-ordered sequence of events, wherein each event has features specific to each event, said system comprising an algorithm adapted to:

sequentially process the events in an order of processing, wherein to process includes to select for each event processed at least one feature comprised by the event and to update a frequency count of each feature so selected;

select frequency counts for subsequent deletion upon satisfaction of a condition that determines which frequency counts to delete; and delete said selected frequency counts.

The present invention provides a computer program product, comprising:

a computer usable medium having a computer readable program code embodied therein for controlling the growth of a features frequency profile of a time-ordered sequence of events, wherein each event has features specific to each event, and wherein the computer readable program code comprises an algorithm adapted to:

sequentially process the events in an order of processing, wherein to process includes to select for each event processed at least one feature comprised by the event and to update a frequency count of each feature so selected;

select frequency counts for subsequent deletion upon satisfaction of a condition that determines which frequency counts to delete; and delete said selected frequency counts.

The present invention provides a probabilistic classifier method, comprising determining whether it is more probable for a given event to belong to a first class of first events than to a second class of second events, based on a probabilistic classifier model that uses a renormalized first features frequency profile of a first time-ordered sequence of the first events and a renormalized second features frequency profile of a second time-ordered sequence of the second events, wherein each first event has features specific to each first event, wherein each second event has features specific to each second event, wherein the first class has a first characteristic relating to the first events, wherein the second class has a second characteristic relating to the second events, and wherein the first and second characteristics are mutually exclusive.

The present invention provides a computer program product, comprising a computer usable medium having a computer readable program code embodied therein for implementing a probabilistic classifier method, wherein the computer readable program code comprises an algorithm adapted to determine whether it is more probable for a given event to belong to a first class of first events than to a second class of second events, based on a probabilistic classifier model that uses a renormalized first features frequency profile of a first time-ordered sequence of the first events and a renormalized second features frequency profile of a second time-ordered sequence of the second events, wherein each first event has features specific to each first event, wherein each second event has features specific to each second event, wherein the first class has a first characteristic relating to the first events, wherein the second class has a second characteristic relating to the second events, and wherein the first and second characteristics are mutually exclusive.

The present invention advantageously provides a method and system that avoids having data storage requirements of a television (TV) viewer preference profile exceed the amount of memory space available in a computing device that utilizes the preference profile to predict which TV programs the TV viewer would like to watch. The present invention has an additional advantage of using a TV viewer preference profile that is more responsive to recent information than to older information.

BRIEF DESCRIPTION OF THE DRAWINGS

FIG. 4 is a table illustrating the computation of renormalized frequency counts, in accordance with embodiments of the present invention.

DETAILED DESCRIPTION OF THE INVENTION

Figure 1:
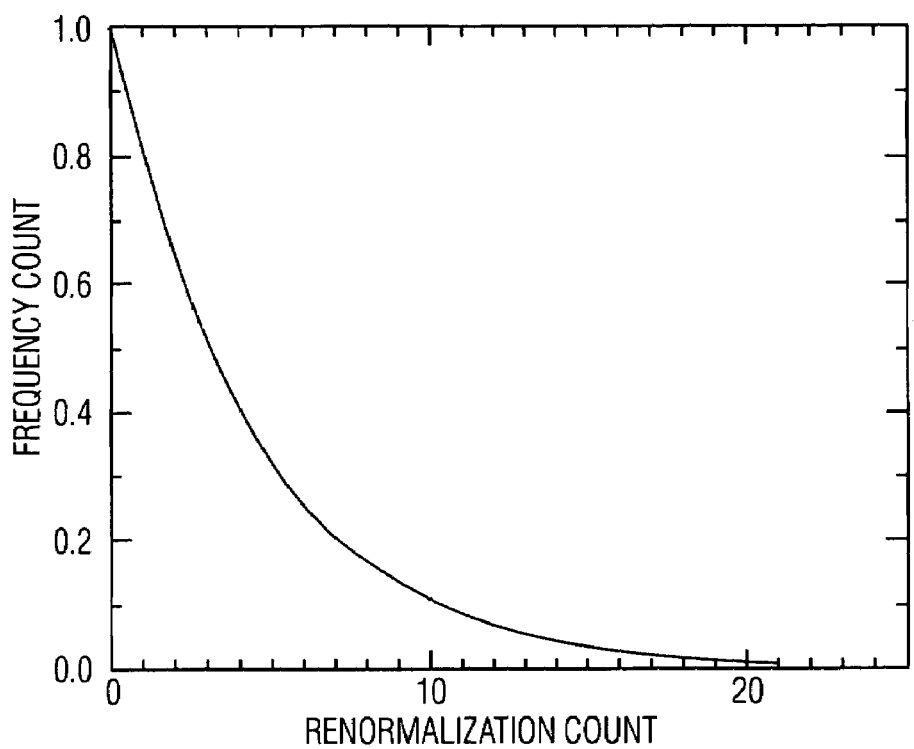
FIG. 1 is a graph illustrating time decay of a frequency count for a television (TV) show feature that has ceased to reappear in the view history of a TV viewer, in accordance with embodiments of the present invention.

As a television (TV) viewer continues to watch TV shows, a viewer profile of the TV user may be developed. A "TV viewer" is defined either as one person or as an entire household who watches TV programs. The TV viewer profile comprises frequency counts for the frequency of occurrence of features that characterize the TV shows watched by the TV viewer. Features of a TV show may be found in a source such as, inter alia, an Electronic Program Guide (EPG). Such features may include: genre, duration, language, rating, actors, director, closed captioning, date of origination, sexual content, violent content, etc.

A system for using conditional probabilistic calculations, in conjunction with the aforementioned TV viewer profile, to recommend TV programs for the TV viewer is disclosed in the U.S. application Ser. No. 09/498,271 filed Feb. 4, 2000, entitled "Adaptive TV Show Recommender," ("Ser. No. 09/498,271") assigned to the assignee of the present invention and incorporated by reference in its entirety herein. The probabilistic calculations in Ser. No. 09/498,271 are in the form of a probabilistic classifier theory such as a Bayesian probabilistic classifier theory (see Ser. No. 09/498,271, e.g.: page 4, line 7-page 14, line 1; FIGS. 5a, 5b, 5c, and accompanying description thereof). This system recommends TV programs in consideration of using the TV viewer profile of TV programs watched by the TV viewer in combination with a profile of TV programs not watched by the TV viewer. The system described by Ser. No. 09/498,271 discloses that one may obtain TV programs for generation of the profile of TV programs not watched by the TV viewer by use of random sampling from the full set of TV programs not watched by the TV viewer (see Ser. No. 09/498,271, e.g.: page 6, line 21-page 7, line 19; page 13, line 8-page 14, line 12). The TV program embodiment discussed in Ser. No. 09/498,271 includes a special case of using a Bayesian classifier model (see Ser. No. 09/498,271, e.g., page 9, line 8-page 14, line 1) to compare the class of watched TV programs with the class of unwatched TV programs, with respect to the frequency counts in the watched and unwatched TV viewer profiles, in order to predict preferences of the associated TV viewer. The present invention envisions the application of features profiles to meaningful class comparisons more generally, and examples of such comparisons will be discussed infra.

Denoting $f_i$ as the frequency count of a TV feature i, $f_i$ is initialized to $f_i=1$ when the feature i initially appears in the TV viewer's history, and $f_i$ is incremented by 1 for each subsequent appearance of the feature i in shows watched by the TV viewer. In that manner, the frequency of each feature appearing in shows watched by the viewer, and the number of such features, grows in time. As the features frequency profiles are developed and used in a data processing device having limited data storage capacity (e.g, as in a miniature digital recording device such as a personal digital assistant (PDA)), the memory of the data processing device may become filled and thus become unable to further develop the features frequency profiles. Additionally, a "momentum effect" may develop. The momentum effect is the steady reduction in the impact, on the recommendations, of new shows added to the TV viewer's profile. For example, if there are 100 shows in a profile and the viewer views one new show, it's effect is roughly 1/100. But if there are 1000 shows in the profile, a new show will have a much smaller impact. As the number of shows in the profile increase, the marginal effect of new information declines.

The present invention periodically renormalizes the frequency profiles of the accumulated features, so as to reduce the feature counts. As the features are reduced, the present invention discards those features whose frequency count has been reduced to a value that is less than a threshold value. In that manner, obsolete features are discarded and the size of the features frequency profile is reduced so as to stabilize the amount of data necessary to characterize the features frequency profile.

Renormalization in its basic form is just a uniform reduction of all feature counts for a class (watched/not-watched) to a normal denominator, say 100. Renormalization steadily discounts the impact of old information relative to new information. Consequently, instead of frequency counts being required to be integers (and allowing speedy integer arithmetic), frequency counts may be reals because renormalization generally yields real numbers. However, integers could be used to as an approximation in the implementation of the real arithmetic processes.

Two parameters, namely N1 and N2, define the renormalization strategy of the present invention. Let N1 be the normalization base value; e.g., 100 for illustration. Let N2 be the renormalization trigger value; e.g., 120 for illustration. Note that $N2>N1\geq 1$. If N denotes a count of the number of TV programs watched by the TV viewer, then renormalization is triggered when N>N2. The renormalization reduces each frequency count by a reduction factor of N1/N and then resets N to N1. The reduction factor calculates to N1/(N2+1) or less, since the first opportunity for the renormalization to potentially occur is at the first value of N that exceeds N2; namely, at N=N2+1. If the reduction factor is calculated and used after each event, then the reduction factor is N1/(N2+1). However, if the events are processed in batches with a plurality of events in each batch, then the reduction factor is less than N1/(N2+1). As an example, a batch may include all events that occur in a single day. The renormalization controls the momentum effect, since N is always constrained to be between N1 and $N2+N_E$, wherein $N_E$ is the number of events in the batch being processed. Note that for a batch size of 1, $N_E=1$ and N is constrained to be between N1 and N2+1.

Controlling the profile growth means discarding some features. In general, it is desirable to discard as few features as possible. One idea is to discard features whose frequency counts have become very low; however it is desirable to avoid deleting rare but important features. A reason to delete features is to avoid the profile's exceeding the allowed memory for it. Thus, it is necessary to specify what to delete and when. The basic idea is to identify the least useful features and remove as few as possible in order to maintain profile size within acceptable bounds. A property of a feature that suggests deletion of the feature is a sufficiently small frequency count. Thus, the present invention specifies a third parameter, N3 (which is a real number) and deletes all features whose frequencies fall below N3.

The renormalization process is generally a process that accumulates all information, but discards older information in favor of more recent information. The frequency count for any feature will decay exponentially over time if no new entries (i.e., new TV shows) have this feature. Let $f_i(k)$ be the frequency count for feature i at time k where k will index over renormalizations. Let k=0 be the first time feature $f_i$ appears. Then, $f_i(k)=f_i(0)R^k$ where R is the renormalization factor (N1/N). FIG. 1 illustrates the exponential decay in $f_i$ for $f_i(0)=1$, N 1=100, N2=124, and N3=0.8, in accordance with embodiments of the present invention. The reduction factor relating to FIG. 1, is 0.8 (i.e., N1/(N2 +1) or $^{100}/_{125}$).

To illustrate the renormalization calculation, assume that $f_i(k)$ had dropped to 0.5 and two new shows are added to the profile having this feature. As a result, $f_i(k+1)$ would jump to 2.5 and then be renormalized to 2.0 (2.5*0.8). Now consider alternative choices for N1 and N2. For example, consider N1=1 and N2=2, which would trigger renormalization as each new show is added to the profile and $f_i(k)$ would decrease very rapidly (by one half with each new show). For example, assume that a TV viewer watches one instance of his favorite comedy show, followed by 3 football games. At this point, the features of the comedy show will have decreased by a factor of 1/16, which is an excessively fast decay. Although it may seem that N1 may have almost any value, (since no renormalization will be done until the profile includes at least N2+1 shows), it is the reduction factor of N1/(N2+1) that determines the rate of decay of old information. If the reduction factor is too small, many important features will rapidly decline in influence and be discarded too soon. If the reduction factor is too high, too many noise features will continue to influence the recommendations and the profile will grow very large and the system's responsiveness to new information will be less. An idea that may help in making this tradeoff is that the difference (N2−N1) should be large enough that a reasonable sampling of the variety of shows the viewer usually prefers will be present. Accordingly, the important types of shows will have their features decayed in unison and they are likely to be refreshed quite regularly. The larger this difference between N2 and N1,. the more likely it is that the sample is a representative sample, but the less frequently the renormalizations will be performed so that the the system will be less responsive to changing preferences. Thus, viewers with wide and stable preferences would be best served by a large difference between N2 and N1, and viewers with narrow and changing preferences would be best served by a small difference between N2 and N1. The present invention also contemplates adjusting N2 automatically.

N3 determines when features are permanently discarded from the profile. Here again there is a tradeoff. To constrain the growth of the profile, features that are essentially noise need to be discarded, since such "noisy" features occur rarely and convey no real information about the viewer's preferences. Unfortunately, there are some features which occur rarely, but which carry important information. For example, operas are broadcasted infrequently but are of great interest to opera fans. In consideration of setting N3, a recent examination of a body of TV viewing data from Nielsen Media Research, Inc. suggests that the average American viewer watches about 20 TV shows per week. A similar examination of viewer history data available to the inventor of the present invention yielded values in the range of 6–13 shows per week. A setting of N2=120 and N1=100 implies about one renormalization per week for the average American and about one every two to three weeks for the data available to the inventor of the present invention. With the renormalization factor of 0.8264, a frequency count of 1.0 will decay to 0.084 after 13 renormalizations, and to 0.069 after 14 renormalizations. Thus, the average American viewer can expect features seen once to be discarded after about 13 weeks if they are not seen again in that interval. For less active viewers, such features will remain longer in their profiles. Thirteen weeks is not long enough to retain features from one annual sporting season to the next, so a lower value for N3 is probably desirable. However, very few features would be discarded if N3 is too low. A value of N3 not exceeding about 0.10 may be suitable for some applications (e.g., N3=0.07).

Figure 2:
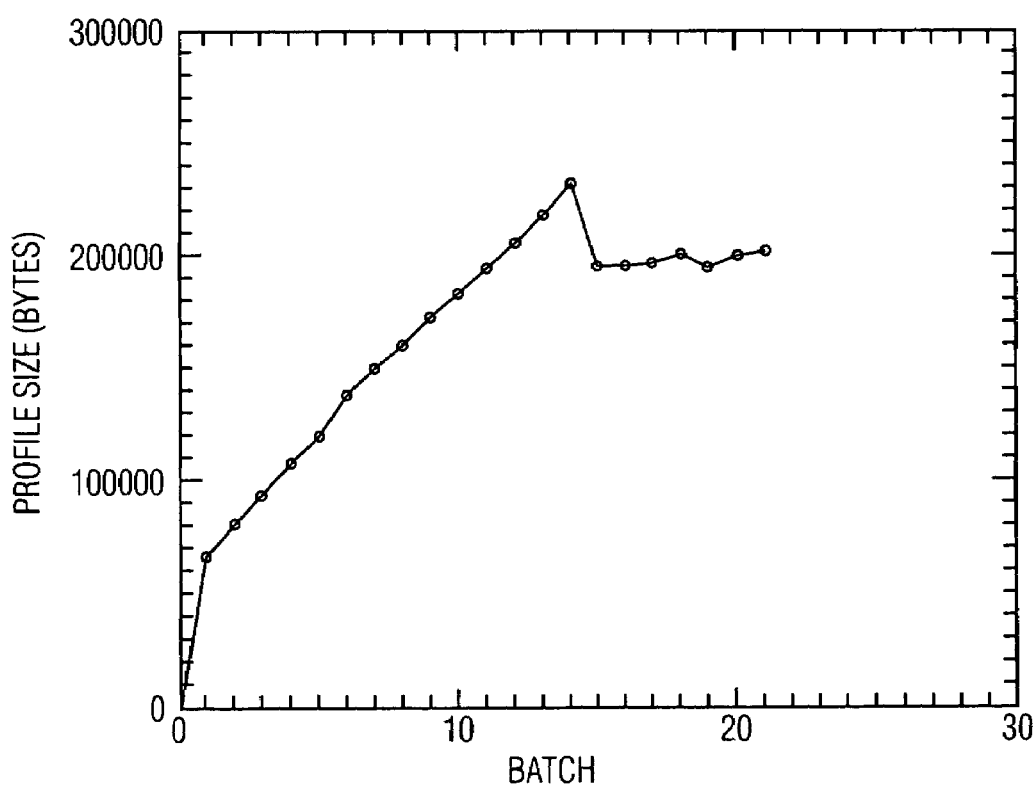
FIG. 2 is a graph illustrating growth of the size of a TV viewer preference profile, in accordance with embodiments of the present invention.

FIG. 2 is a graph illustrating growth of the size (in bytes) of a TV viewer preference profile based on the TV viewing history of one viewer, in accordance with embodiments of the present invention. FIG. 2 is based on N1=100, N2=120, and N3=0.07. The data of FIG. 2 were supplied to in batches: an initial batch comprised 100 watched TV shows and 100 not watched TV shows. All subsequent batches comprised 21 shows, so that each batch triggered a renormalization. In FIG. 2, the viewer profile continues to grow until the $14^{th}$ renormalization. At that point, features begin to be discarded and the size stabilizes.

An upper bound to viewer profile size depends on the range of TV shows that each viewer prefers. A viewer with narrow interests will be constantly refreshing only a limited number of features and the other features will decay and be eliminated. A viewer with very diverse interests will need to accommodate more features to have the same level of recommender performance.

Figure 3:
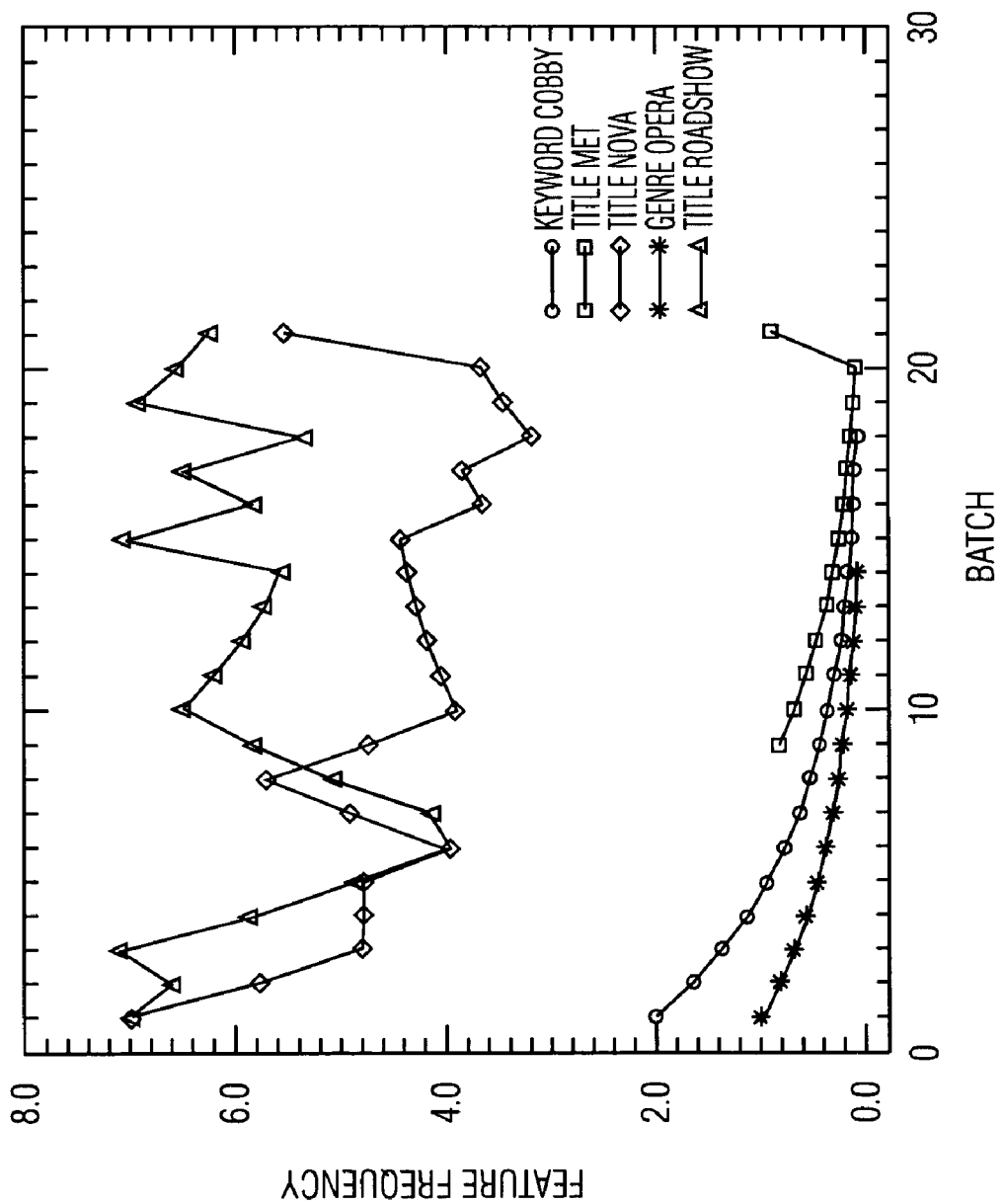
FIG. 3 is a graph illustrating the effect of renormalization on the frequency count of TV show features, in accordance with embodiments of the present invention.

FIG. 3 is a graph illustrating the effect of renormalization on the frequency count of TV show features for the same experiments as was described supra in conjunction with FIG. 2, in accordance with embodiments of the present invention. The upper two curves in FIG. 3 illustrate what happens to features that characterize regular favorite shows. A "regular" show is a show for which there are plentiful opportunities to be viewed. The two features of the two upper curves are the titles of two such shows. All features experience decay, but this type of feature is regularly refreshed. The lower three features in FIG. 3 illustrate the impact of decay on more rare features. The feature "keyword cabby" is of no real significance to this viewer. The feature "keyword cabby" occurred in two shows in the initial batch of 100 shows and not again after that. The feature "keyword cabby" experienced exponential decay until it was eliminated at batch 19.

In relation to FIG. 3, the viewer is a fan of opera which is a not very "regular" type of TV show. We see that one show with "genre opera" occurred in the initial batch of 100 shows and did not occur in any batch following the initial batch. Hence, this feature was eliminated at batch 15, which is unfortunate. A show with the title "Metropolitan Opera . . . " was viewed in batch 9. Just as the feature "title Met" was about have its frequency count fall below N3 (i.e., 0.07) and thus be eliminated from the viewer profile, another show with "title Met" feature was viewed in batch 21. Thus, the 'title Met' feature was given an extended chance to remain in the viewer profile. One may reasonably ask, "why was "genre opera" not refreshed when the Metropolitan Opera was viewed?" The answer lies in the vagaries of the EPG metadata: not all operas (or any other shows) are necessarily labeled consistently. The Metropolitan Opera shows were assigned genre: music and not genre: opera. Unfortunately, a recommender must operate in this environment.

FIG. 4 is a table illustrating the computation of renormalized frequency counts, in accordance with embodiments of the present invention. FIG. 4 shows 22 TV programs watched by a TV viewer processed in the order 1, 2, . . . , 22, with four features, namely: Sports, News, Live (i.e., broadcast of live material), and Taped (i.e., broadcast of taped material). For this example, N1=6, N2=9, and N3=0.80 which implies a renormalization factor of 0.60 (i.e., N1/(N2+1)=6/10) This is a fictitious example for illustrating how to perform the renormalization calculations and not for illustrating how to use the invention in an optimum manner; i.e., N1, N2, and N3 were not chosen in light of design considerations but rather for showing how the calculations are performed. In a real application, many more than four features are likely to appear in the TV viewer profile. Under "Features Present" a presence of "1" indicates a presence of a feature for the relevant program. As examples, Program #1 has the features of "Sports" and "Live", Program #5 has the features of "News" and "Live", and Program #9 has the features of "Sports" and "Taped".

Under "Feature Frequency Count," the feature counts are updated after each of the 22 programs. Each updating adds 1 to the frequency count of a feature for each new appearance of the feature. Since the features are renormalized at N>N2 and since N2=9, the first renormalization occurs at N=10, resulting in multiplication of each frequency count by the renormalization factor of 0.60 and resetting N to 6 (i.e., executing N=N1 ). For example, at N=10, the prior Sports feature count of 5 is incremented by 1 to yield 6, and 6 is multiplied by the renormalization factor of 0.60 to yield a count of 3.6 for the Sports feature after Program #10 is processed. Similarly, renormalization also occurs after Program #15 and Program #20. Since N3=0.80, the "Taped" feature is dropped after Program #10 is processed, since the "Taped" feature has acquired a frequency count of 0.6 which is less than N3. Similarly, the "News" feature is dropped after Program #20 is processed, since the "News" feature has acquired a frequency count of 0.79 which is less than N3.

The preceding focused attention on features frequency profiles which relate to TV programs watched by a TV viewer. As mentioned supra, and described in detail in Ser. No. 09/498,271, a Bayesian classifier model could be used to compare the class of watched TV programs with the class of unwatched TV programs, with respect to the frequency counts in the watched and unwatched TV viewer profiles, in order to predict preferences of the associated TV viewer. For such application to TV programs, the present invention assumes that any classifier model or theory disclosed in Ser. No. 09/498,271 could utilize the renormalized frequency profiles disclosed herein, in accordance with the present invention, for making class comparisons such as for predicting the preferences of a TV viewer for TV programs. Additionally, the present invention envisions the application of renormalized features profiles, as disclosed herein, to meaningful class comparisons generally, and three examples will be discussed infra to illustrate the generality of applicability of the present invention.

In a first example, a classifier model (e.g., a Bayesian classifier model) could be applied to entertainment events of any kind such as, inter alia, movies at movie theaters, live theater, sports events, musical events, etc. Renormalization of feature counts could be implemented as described supra herein, in accordance with the present invention, for entertainment events of a specified type (i.e., TV programs, movies at movie theaters, live theater, sports events, live musical performances, recorded musical events, books or other publications purchased, books or other publications borrowed such as from a library, Internet pages visited, etc.). Any classifier model or theory disclosed in Ser. No. 09/498,271 could utilize the renormalized frequency profiles disclosed herein for making class comparisons such as for predicting the preferences of a viewer of the entertainment event of the specified type. Such a classifier model could compare the class of entertainment events (of the specified type) viewed with the class of entertainment events not viewed in the same manner as disclosed in Ser. No. 09/498, 271 for TV programs. The class of entertainment events not viewed could be established by random sampling in a same manner as is described in Ser. No. 09/498,271 for selecting TV programs not watched.

In a second example, a classifier model (e.g., a Bayesian classifier model) could be applied to houses recently sold (or purchased) in a given geographical area, using any applicable features database for describing features of houses, such as a Multiple Listings database of features of houses recently sold and other applicable data. Such features may include, inter alia, house style (e.g., colonial, ranch, etc.), type of heating (e.g., gas heating, oil heating, etc.), presence or absence of central air conditioning, etc. Renormalization of feature counts could be implemented as described supra herein, in accordance with the present invention, for the houses recently sold, and any classifier model or theory disclosed in Ser. No. 09/498,271 could utilize the renormalized frequency profiles disclosed herein for making class comparisons such as for predicting the preferences of buyers of houses. As an example, such a classifier model could compare the class of houses sold within 3 months of being offered for sale with houses offered for sale but not sold within 3 months of being offered for sale. The class of houses offered for sale but not sold within 3 months of being offered for sale could be established by random sampling in a same manner as is described in Ser. No. 09/498,271 for selecting TV programs not watched. Many other types of class comparisons could be made in the context of features of houses recently sold. The scope of the present invention includes any meaningful class comparison, as disclosed in Ser. No. 09/498,271 for TV programs, utilizing renormalized feature counts of the present invention.

In a third example, a classifier model (e.g., a Bayesian classifier model) could be applied to crimes recently prosecuted in a given jurisdiction such as in, inter alia, the state of Massachusetts, the second federal circuit, etc., using any applicable features of the crimes. Such features may include, inter alia, classification of crime (e.g., felony, misdemeanor, etc.), time of day when the crime was committed (e.g., day, evening, night), whether the victim was killed or suffered serious bodily injury, whether the crime was committed by a minor (e.g., a person under 18 years old), etc. Renormalization of feature counts could be implemented as described supra herein, in accordance with the present invention, for the crimes utilized in the analysis. As an example, such a classifier model could compare the class of crimes alleged to have been committed by males with the class of crimes alleged to have been committed by females (the word "alleged" is used since a criminal conviction may not have resulted from the prosecution). As another example, such a classifier model could compare the class of crimes whose prosecution was terminated by jury trial with the class of crimes whose prosecution was terminated by plea bargaining. In the two preceding examples, one or both of the classes being compared could be established deterministically or by random sampling in a same manner as is described in Ser. No. 09/498,271 for selecting TV programs not watched. Many other types of class comparisons could be made in the context of crimes recently prosecuted. The scope of the present invention includes any meaningful class comparison, as disclosed in Ser. No. 09/498,271 for TV programs, utilizing renormalized feature counts of the present invention.

The renormalization of feature counts will next be described generally without limitation as to the application context. As described supra, the renormalization of feature counts and its utilization in conjunction with a probabilistic classifier model may be applied to virtually any subject area in which meaningful class comparisons may be made. The concept of TV programs is now replaced by events, or more particularly by a time-ordered sequence of events. In the context of the preceding examples, events may comprise TV programs, entertainment events, houses recently sold, crimes recently prosecuted, etc. Each event in the sequence has features specific to each event (e.g., features specific to a given TV program, features specific to a given entertainment event, features specific to a given house recently sold, features specific to a given crime recently prosecuted, etc.). A set of features is considered to be specific to a given event if the set of features characterizes the given event and does not necessarily characterize any other event.

Figure 5:
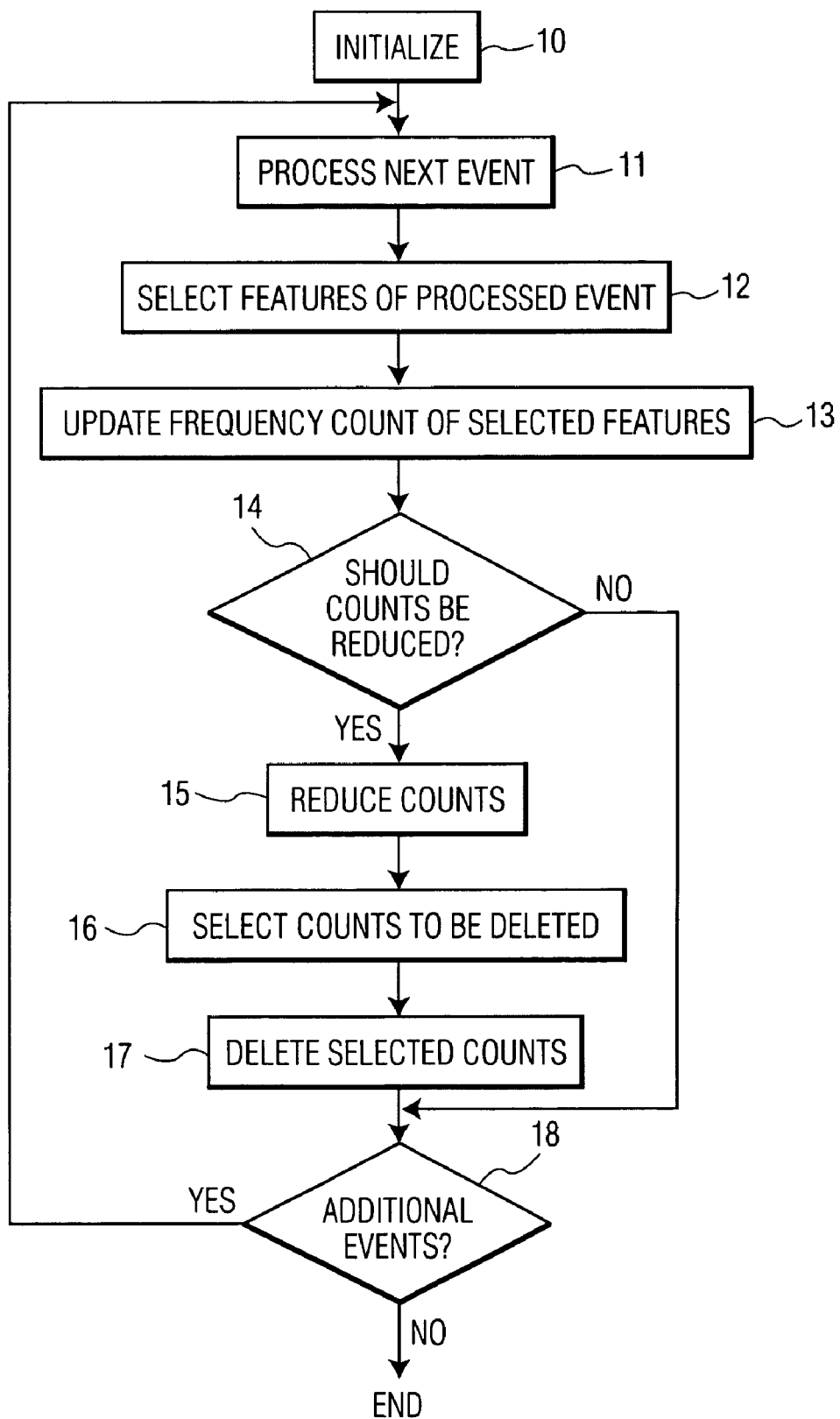
FIG. 5 is a flow chart illustrating an algorithm for controlling the growth of a features frequency profile of a time-ordered sequence of events, in accordance with embodiments of the present invention.

FIG. 5 is a flow chart illustrating an algorithm for controlling the growth of a features frequency profile of a time-ordered sequence of events, in accordance with embodiments of the present invention. The features for each events in the time-ordered sequence may be comprised by a list of features such as would be contained in a file, table, database, etc.; e.g., in an EPG for TV programs or in a Multiple Listing database for houses for sale or recently sold.

In FIG. 5, step 10 is an initialization step comprising setting N=0 (N is an event counter) and establishing values of N1, N2, and N3, wherein the parameter of N, N1, N2, and N3 have the same definitions for "events" as the definitions that these parameters have for TV programs as defined supra. Thus N2>N1≧1. The events are sequentially processed in an order of processing that may be the same order as is the order of the time-ordered sequence of events. Alternatively, the order of processing of the events may deviate from the order of the time-ordered sequence of events.

Step 11 initiates processing of the next event in the order of processing.

Step 12 selects for the event being processed at least one feature comprised by the event being processed. The selecting of at least one feature for the event being processed may not result in selecting all of the features that are specific to the event being processed. Alternatively, the selecting of at least one feature for the event being processed may result in selecting all of the features that are specific to the event being processed.

Step 13 updates a frequency count of each feature selected in step 12. The frequency count is set to 1 for each feature appearing for the first time, whereas the frequency count is updated (i.e., incremented by 1) for each feature that is already in existence and again appearing. Counts in existence but not again appearing remain unchanged until subsequently renormalized. The use of "1" as an initial count value or as a count increment is arbitrary and any numerical magnitude could be used as an initial count value or as a count increment.

Step 14 is a decision box which determines whether to reduce the existing frequency counts, which is equivalent to determining whether to renormalize the frequency counts. Renormalization should occur (and the frequency counts should therefore be reduced) whenever N>N2, where it is recalled that N is a count of the number of events that have been processed. Thus if N>N2 then steps 15–17 are executed followed by execution of step 18, whereas if N≦N2 then steps 15–17 are bypassed and step 18 is next executed.

Step 15 reduces the frequency counts by a reduction factor and also resets N to N1 (i.e., N=N1 ). The reduction factor may be N1/N (which is equal to N1/(N2+1) or less, as stated supra). More generally, the reduction factor may take another form such as, inter alia, a function of (N1/N) that is less than 1. For example, the reduction factor may take the form of $(N1/N)^P$ wherein P is a positive real number. Note that if P=1 then the reduction factor is N1/N.

Step 16 selects frequency counts to be deleted upon satisfaction of a condition. Deleting a frequency count means herein deleting all information pertaining to the feature whose count is being deleted. Thus deleting a feature reduces the burden on the memory space that is used to store information about features. The condition may comprise, inter alia, determining to delete a given frequency count if the given frequency count falls below a threshold value (N3). N3 may be feature dependent. Alternatively, N3 may be feature independent (i.e., constant); e.g., N3 may have a feature-independent value that does not exceed about 0.10 or 0.07.

Step 17 deletes those frequency counts selected for deletion in step 16, if at least one frequency count has been selected for deletion in step 16.

Step 18 is a decision box which determines whether to process additional events. If NO then the algorithm terminates. If YES then process control is returned to step 11 for processing the next event and steps 11–18 are repeated.

Figure 6:
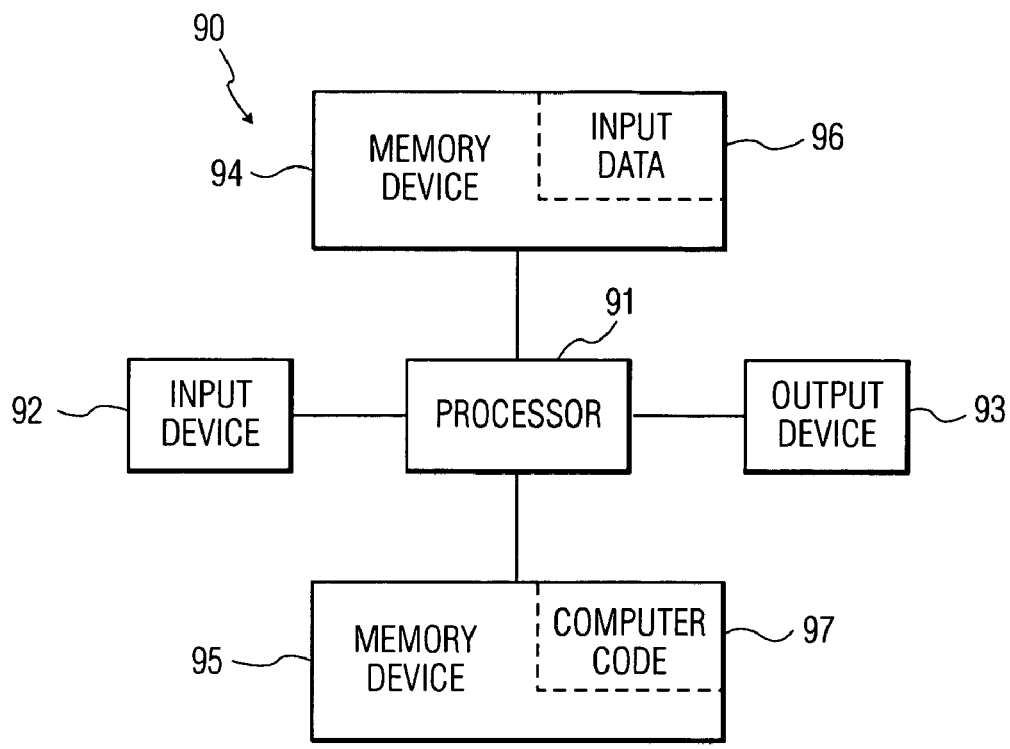
FIG. 6 illustrates a computer system for controlling the growth of a features frequency profile of a time-ordered sequence of events, in accordance with embodiments of the present invention.

FIG. 6 illustrates a computer system 90 for controlling the growth of a features frequency profile of a time-ordered sequence of events, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 include a writeable memory and comprise, inter alia, a hard disk, a dynamic random access memory (DRAM), a read-only memory (ROM), etc. The memory device 95 includes a computer code 97. The computer code 97 includes an algorithm for controlling the growth of a features frequency profile of a time-ordered sequence of events (i.e., the algorithm depicted in FIG. 5 and described herein). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable medium having a computer readable program code embodied therein, wherein the computer readable program code comprises the computer code 97.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

The computer system 90 of FIG. 6 may exist on any scale, or in any form, such as: a mainframe computer system, an engineering workstation, a personal computer system, a miniature digital recording device (e.g., a personal digital assistant (PDA)), a set-top box, a data processing system comprising a personal hard-disk recorder, a computer within a television set, etc. If the computer system 90 represents a miniature digital recording device, then certain devices (e.g., a printer) in FIG. 6 will obviously not be present.

Figure 7:
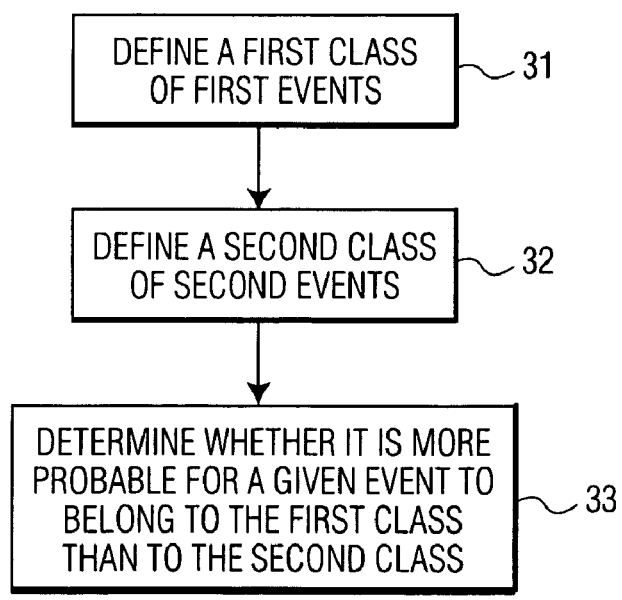
FIG. 7 is a flow chart of a probabilistic classifier method, in accordance embodiments of the present invention.

The renormalization of feature counts, in accordance with the present invention, will next be applied in a general way toward utilizing a probabilistic classifier method such as a Bayesian probabilistic classifier method. FIG. 7 is a flow chart of the probabilistic classifier method, in accordance embodiments of the present invention.

In FIG. 7, step 31 defines a first class of first events having a first characteristic relating to the first events. Step 32 a second class of second events having a second characteristic relating to the second events, wherein the first and second characteristics are mutually exclusive. Step 33 determines whether it is more probable for a given event to belong to the first class than to the second class, based on a probabilistic classifier model that uses a renormalized first features frequency profile of a first time-ordered sequence of the first events and a renormalized second features frequency profile of a second time-ordered sequence of the second events. Each first event has features specific to each first event, and each second event has features specific to each second event.

The renormalized first features frequency profile and the renormalized second features frequency profile may be generated by the renormalization techniques described supra herein.

To illustrate the probabilistic classifier method of the present invention, consider the example of determining whether a given TV program is more likely to be watched by a TV viewer or is more likely not to be watched by the TV viewer. The first class is the class of TV programs watched by the viewer, and the second class is the class of TV programs not watched by the viewer. The first events are watched TV programs belonging to the first class, and the second events are not watched TV programs belonging to the second class. The first characteristic relating to first events comprises TV programs having been viewed by the TV viewer. The second characteristic relating to second events comprises TV programs not having been viewed by the TV viewer. Determining which of the first class and the second class the given event is more likely to belong to comprises determining whether the given TV program is more likely to be watched or not watched. In the preceding example, TV programs could be generalized to entertainment events. Note that TV programs watched by the viewer and TV programs not watched by the viewer are mutually exclusive characteristics respectively relating to the first class and the second class.

More generally, consider the example of determining whether a given event is more likely to be participated in by a participant or more likely not to be participated in by the participant. An example of an event is a recent sale of a house in a given geographical area or a recent crime prosecuted in a given jurisdiction. A "participant" is defined as one or more persons. The first class is the class of events participated in by the participant. The second class is the class of events not participated in by the participant. The first events are events participated in belonging to the first class, and the second events are events not participated in belonging to the second class. The first characteristic relating to first events comprises the first events having been participated in by the participant (e.g., for-sale houses having been purchased by buyers). The second characteristic relating to second events comprises the second events not having been participated in by the participant (e.g., for-sale houses not having been purchased by buyers). For the house sales/purchases example, determining which of the first class and the second class the given event is more likely to belong to comprises determining whether a given house is more likely to be sold or not sold. Note that houses purchased by buyers and houses not purchased by buyers are mutually exclusive characteristics respectively relating to the first class of for-sale houses purchased and to the second class of for-sale houses not purchased.

The parameters N1, N2, and N3 may each be class independent or class independent. As a first example, N1 may have the same value or different values for first class and the second class. As a second example, N2 may have the same value or different values for first class and the second class. As a third example, N3 may have the same value or different values for first class and the second class.

The computer system 90 of FIG. 6, described supra, may be used to implement the probabilistic classifier method of FIG. 7, wherein the computer code 97 may includes an algorithm that executes the probabilistic classifier method of FIG. 7.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for controlling the growth of a features frequency profile of a time-ordered sequence of events, wherein each event has features specific to each event, said method including:
    sequentially processing the events in an order of processing, including selecting for each event processed at least one feature related to the content included in the event and updating a frequency count of each feature selected;
    selecting frequency counts for subsequent deletion upon satisfaction of a condition that determines which frequency counts to delete; and
    deleting said selected frequency counts, wherein the condition for determining to delete a given frequency count is satisfied if the given frequency count falls below a threshold value (N3).

2. The method of claim 1, wherein N1 and N2 are defined as positive integers such that $N2 > N1 \geq 1$ and N is defined as a count of the number of events that have been processed, and wherein if $N > N2$ then further comprising reducing each frequency count by a reduction factor and resetting N to $N = N1$.

3. The method of claim 2, wherein the reduction factor is (N1/N1/N)P such that P is a positive real number.

4. The method of claim 3, wherein P=1.

5. The method of claim 1, wherein N3 is feature dependent.

6. The method of claim 1, wherein N3 is feature independent.

7. The method of claim 1, wherein the order of processing is such that the events are processed in the order of the time-ordered sequence of events.

8. The method of claim 1, wherein the selecting of at least one feature for a given event processed does not result in selecting all of the features that are specific to the given event.

9. The method of claim 1, wherein the selecting of at least one feature for a given event processed results in selecting all of the features that are specific to the given event.

10. The method of claim 1, wherein a list of features for each event processed enumerates the features specific to each event processed.

11. The method of claim 1, wherein sequentially processing the events comprises sequentially processing the events in batches, wherein each batch comprises a plurality of events.

12. The method of claim 1, wherein the events comprise entertainment events actually viewed by a given person or a given household.

13. The method of claim 12, wherein the events comprise television (TV) programs.

14. The method of claim 12, wherein the events comprise theatrical movies.

15. The method of claim 12, wherein the events comprise sports events.

16. The method of claim 1, wherein the events comprise houses sold in a given geographical area.

17. The method of claim 1, wherein the events comprise crimes prosecuted in a given jurisdiction.

18. The method of claim 1, wherein the events comprise entertainment events not viewed by a given person or a given household.

19. The method of claim 18, wherein said entertainment events not viewed are randomly selected.

20. A system for controlling the growth of a features frequency profile of a time-ordered sequence of events, wherein each event has features specific to each event, said system including an algorithm adapted to:
sequentially process the events in an order of processing, wherein to process includes to select for each event processed at least one feature related to content within the event and to update a frequency count of each feature selected;
select frequency counts for subsequent deletion upon satisfaction of a condition that determines which frequency counts to delete; and
delete said selected frequency counts, wherein the condition for determining to delete a given frequency count is satisfied if the given frequency count falls below a threshold value (N3).

21. The system of claim 20, wherein N1 and N2 are defined as positive integers such that $N2 > N1 \geq 1$ and N is defined as a count of the number of events that have been processed, and wherein if the algorithm determines that $N > N2$ then the algorithm is further adapted to reduce each frequency count by a reduction factor and reset N to $N = N1$.

22. The system of claim 21, wherein the reduction factor is (N1/N)P such that P is a positive real number.

23. The system of claim 22, wherein P=1.

24. The system of claim 20, wherein N3 is feature dependent.

25. The system of claim 20, wherein N3 is feature independent.

26. The system of claim 20, wherein the order of processing is such that the events are processed in the order of the time-ordered sequence of events.

27. The system of claim 20, wherein the algorithm is adapted to select for a given event processed all of the features that are specific to the given event.

28. The system of claim 20, wherein the algorithm is adapted to select for a given event processed less than all of the features that are specific to the given event.

29. The system of claim 20, wherein a list of features for each event processed enumerates the features specific to each event processed.

30. The method of claim 20, wherein to sequentially process the events comprises to sequentially process the events in batches, wherein each batch comprises a plurality of events.

31. The system of claim 20, wherein the events comprise entertainment events actually viewed by a given person or a given household.

32. The system of claim 31, wherein the events comprise television (TV) programs.

33. The system of claim 31, wherein the events comprise theatrical movies.

34. The system of claim 31, wherein the events comprise sports events.

35. The system of claim 20, wherein the events comprise houses sold in a given geographical area.

36. The system of claim 20, wherein the events comprise crimes prosecuted in a given jurisdiction.

37. The system of claim 20, wherein the events comprise entertainment events not viewed by a given person or a given household.

38. The system of claim 37, wherein said entertainment events not viewed are randomly selected.

39. The system of claim 20, further comprising a set-top box that comprises the algorithm.

40. The system of claim 20, further comprising a personal hard-disk recorder that comprises the algorithm.

41. The system of claim 20, further comprising a miniature digital recording device that comprises the algorithm.

42. The system of claim 41, wherein the miniature digital recording device comprises a personal digital assistant (PDA).

43. A computer readable medium embodying a computer program product, the computer program when executed by a processor is configured to
control the growth of a features frequency profile of a time-ordered sequence of events, wherein each event has features specific to each event, by performing the acts of:
sequentially processing the events in an order of processing, wherein to process includes to select for each event processed at least one feature related to content within the event and to update a frequency count of each feature selected;
selecting frequency counts for subsequent deletion upon satisfaction of a condition that determines which frequency counts to delete; and
deleting said selected frequency counts, wherein the condition for determining to delete a given frequency count is satisfied if the given frequency count falls below a threshold value.

44. The computer program product of claim 43, wherein N1 and N2 are defined as positive integers such that $N2 > N1 \geq 1$ and N is defined as a count of the number of events that have been processed, and wherein if the algorithm determines that $N > N2$ then the algorithm is further adapted to reduce each frequency count by a reduction factor and reset N to $N = N1$.

45. The computer program product of claim 44, wherein the reduction factor is (N1/N)P such that P is a positive real number.

46. The computer program product of claim 44, wherein P=1.

47. A probabilistic classifier method, comprising the acts of:
- determining whether it is more probable for a given event to belong to a first class of first events than to a second class of second events, based on a probabilistic classifier model that uses a renormalized first features frequency profile of a first time-ordered sequence of the first events and a renormalized second features frequency profile of a second time-ordered sequence of the second events, wherein each first event has features specific to content within each first event, wherein each second event has features specific to content within each second event, wherein the first class has a first characteristic relating to the first events, wherein the second class has a second characteristic relating to the second events, and wherein the first and second characteristics are mutually exclusive; at least one of said renormalized first features frequency profile and said renormalized second features frequency profile including frequency counts of selected features; and
- deleting selected ones of said frequency counts, wherein the condition for determining to delete a given frequency count is satisfied if the given frequency count falls below a threshold value.

48. The method of claim 47, wherein generation and control of the size of the renormalized first features frequency profile comprises:
- sequentially processing the first events in a first order of processing, including selecting for each first event processed at least one feature comprised by the first event and updating a first frequency count of each feature so selected;
- selecting first frequency counts for subsequent deletion upon satisfaction of a condition that determines which first frequency counts to delete; and
- deleting said selected first frequency counts, and wherein generation and control of the size of the renormalized second features frequency profile comprises:
- sequentially processing the second events in a second order of processing, including selecting for each second event processed at least one feature comprised by the second event and updating a second frequency count of each feature so selected;
- selecting second frequency counts for subsequent deletion upon satisfaction of a condition that determines which second frequency counts to delete; and
- deleting said selected second frequency counts.

49. The method of claim 47, wherein the probabilistic classifier model comprises a Bayesian probabilistic classifier model.

50. The method of claim 47, wherein the first characteristic relating to first events comprises the first events having been participated in by a participant, and wherein the second characteristic relating to second events comprises the second events not having been participated in by the participant.

51. The method of claim 50, wherein second events have been determined by random sampling from a larger set of events not having been participated in by the participant.

52. The method of claim 50, wherein the first events having been participated in by the participant comprises entertainment events having been viewed by a viewer, and wherein the second events not having been participated in by the participant comprises entertainment events not having been viewed by the viewer.

53. The method of claim 52, wherein the entertainment events comprise television programs.

54. A computer readable medium embodying computer program product, the computer program when executed by a processor is configured to implement a probabilistic classifier method comprising the acts of:
- determining whether it is more probable for a given event to belong to a first class of first events than to a second class of second events, based on a probabilistic classifier model that uses a renormalized first features frequency profile of a first time-ordered sequence of the first events and a renormalized second features frequency profile of a second time-ordered sequence of the second events, wherein each first event has features specific to content within each first event, wherein each second event has features specific to content within each second event, wherein the first class has a first characteristic relating to the first events, wherein the second class has a second characteristic relating to the second events, and wherein the first and second characteristics are mutually exclusive; at least one of said renormalized first features frequency profile and said renormalized second features frequency profile including frequency counts of selected features; and
- deleting selected ones of said frequency counts, wherein the condition for determining to delete a given frequency count is satisfied if the given frequency count falls below a threshold value.

* * * * *